Figure 1:
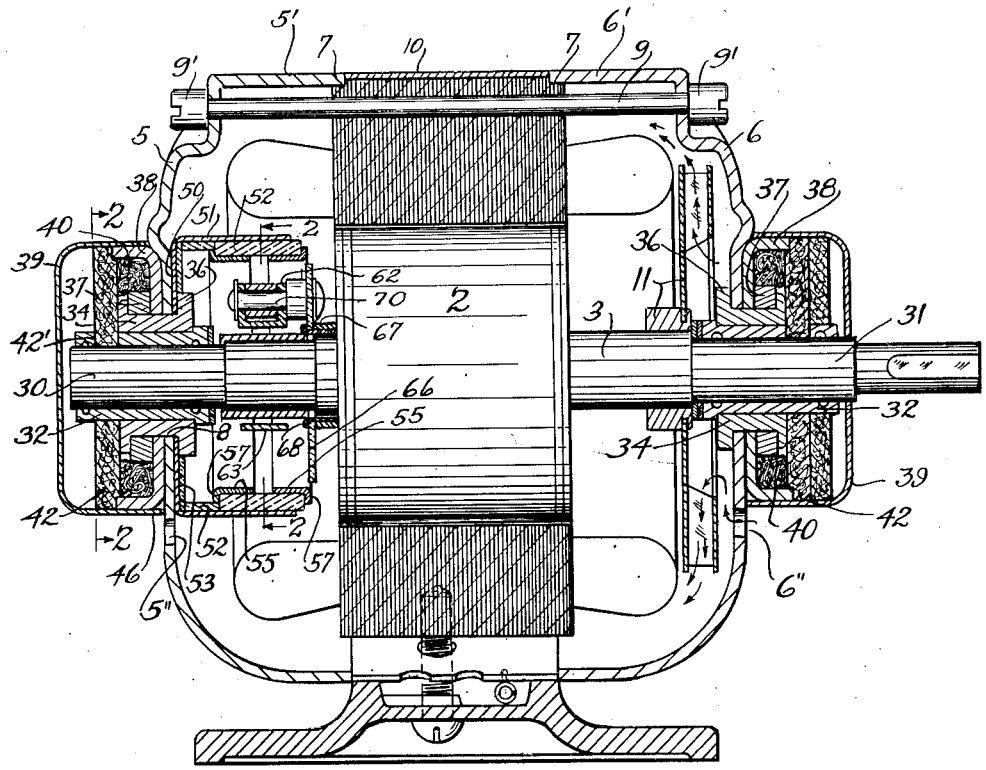

Oct. 15, 1935.  M. H. SPIELMAN  2,017,638

CENTRIFUGAL SWITCH

Filed Nov. 26, 1930

Inventor
Milton H. Spielman
By Bates Golrick & Teare
Attorney

Patented Oct. 15, 1935

2,017,638

UNITED STATES PATENT OFFICE 2,017,638

CENTRIFUGAL SWITCH

Milton H. Spielman, Silver Lake, Ohio, assignor to The Black & Decker Electric Company, Kent, Ohio, a corporation of Ohio Application November 26, 1930, Serial No. 498,377

3 Claims. (Cl. 200—80)

The general object of this invention is to provide an improved centrifugally operated switch and, specifically, one adapted to serve as a cut-out for the starting windings on the stator of an induction motor.

The characteristic features, and other objects, will be discussed in the following description relating to the preferred form of the invention, shown in the drawing. The essential characteristics are summarized in the claims.

Figures 2, 3:
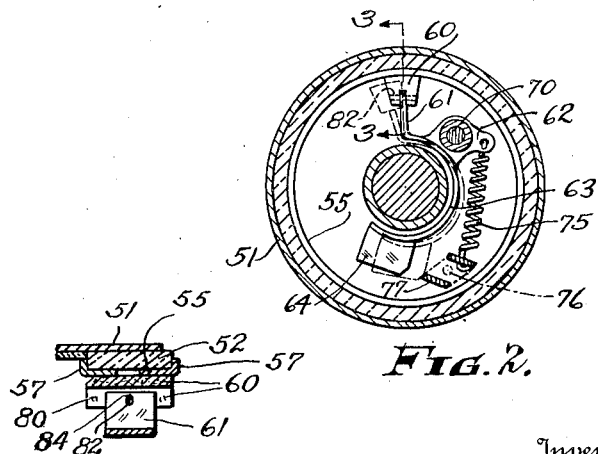

In the drawing, Fig. 1 is a central sectional view through the complete motor; Fig. 2 is a transverse cross sectional detail of the switch mechanism, taken along the line 2—2 on Fig. 1; and Fig. 3 is a sectional detail view of a portion of the switch, taken substantially along the line 3—3 on Fig. 2.

The improved switch mechanism is applied to a motor, which as shown, comprises a stator 1, a rotor 2 and a suitable rotor shaft 3. The rotor and stator may be of any suitable character, the drawing being a more or less diagrammatic illustration of a known type of induction motor stator and rotor. However, from the standpoint of the motor arrangement in general, the stator may comprise the usual field and the rotor an armature therefor, with suitable windings thereon.

The main motor casing members comprise end shells 5 and 6. These are substantially alike and preferably fit the stator at shoulders 7 (see Fig. 1). The casing shells 5 and 6 have central openings at 8 which receive and support bearing assemblies which will be hereinafter described, and the two shells may be secured to each other as well as to the stator by a suitable number of through bolts or studs 9, having clamping devices, such as removable nuts 9' at their ends engaging the outer surfaces of the shells.

Referring to the bearing construction for the rotor shaft 3, the bearings, it will be seen, are very much alike. The shaft has reduced portions at 30 and 31, which reduced portions are journalled in suitable bushing bearing members 32 of any suitable material, bronze for example. The bushings are in turn supported in place in the respective frame shells 5 and 6 by sleeves 34. The sleeves 34 have head portions 36 arranged to lie substantially adjacent the inner surfaces of the shells, and opposite the head portions there is, in each case, a rigid ring 37 which forms a rivet washer, the outer ends of the sleeves 34 being riveted or spun over on the rings.

The lubrication devices, as shown, comprise casings respective to the two ends of the shaft, arranged as follows: There are inner and outer mutually telescoping cup members 38 and 39, the former being of sufficient rigidity to form a fixed support for the latter. The cup members 38 have central openings fitting the sleeves 34 and are held tightly in position against the shells 5 and 6 by the washers or rings 37 and the riveted over ends of the sleeves 34. The inner ends of the bearing bushings 32 have heads which engage the inner ends of the sleeves 34 so as to hold the bushings against movement outwardly, and the outer ends of the bushings 32 extend past the sleeves 34 and are transversely slotted as at 33 (see Fig. 1) to expose the shaft.

The lubricator casings 38—39 are designed to retain suitable capillary material, such as cotton wadding, indicated at 40 lying outwardly from the washers 37. This wadding, being highly absorptive, will soak up a considerable quantity of lubricating oil. The wadding is retained, and lubricant conducted therefrom to the shaft, as required, by fibrous discs 42, which, as shown, radially fill the cup members 39 and lie against the outer edges of the flange portions of the inner cup members 38, portions 42' of the discs lying within the slots 33 of the bushings 32.

The feature of the invention is the arrangement by which the starter windings of an induction motor may be cut out, that is, electrically disconnected from the source of electric power, after the motor has attained running speed. This cutout mechanism is shown in Figs. 1 and 2.

In Fig. 1, there is shown a pressed metal member in the nature of a cup having a wall 50, portions of which lie between the head 36 and the end shell 5, and an outer substantially cylindrical rim or flange 51. The flange supports, on its inner peripheral surface, a suitable insulating ring, such as bakelite, which is spaced from the wall 50 by a ring 52 and washer 53 of similar insulating material. The bakelite ring 52 carries two contact rings 55 of copper or other suitable conductor. These may have the same inside diameters, each being provided with a retaining flange 57, abutting the ends of the bakelite ring 52. Both conductor rings 55 are suitably electrically attached to respective termini of the starting windings (not shown) on the stator.

To make contact between the rings 55 and normally establish the circuit in the starting windings, there is shown a brush 60 which preferably comprises a carbon block adapted to normally bridge both rings 55. The shape of the brush is illustrated in Figs. 2 and 3.

The block or brush 60 is supported on a simple sheet metal arm 61 which has suitable radially extending ears 62, supported as will be presently shown. A curved portion 63 of the arm passes freely about the rotor shaft, out of contact therewith, the extreme end of which portion 63 is provided with a suitable counterweight 64. To pivotally support the arm, I provide a disc 66 of suitable insulating material, the disc being rigidly secured to the rotor, or its shaft, as by means of a sleeve 67 having outwardly turned lugs at 68 entering the disc and clamping it in place on the sleeve. The disc supports a pivot pin 70, a reduced portion of which extends freely through the ears 62. The pin may be riveted over at its outer end to hold the arm in place.

The bearing formed by means of the ears 62 on the pin 70 provides for very free rocking movement of the brush carrying arm, and the arm is normally maintained in such position that the contact rings 55 are bridged by the brush 60, by means of a suitable tension spring at 75, connecting one of the ears 62 to a suitable bracket 76, riveted or otherwise securely fixed to the disc 66. The bracket has one end thereof, 77, positioned in the path of the counterweight 64 to serve as an abutment to limit its outward movement.

In order to provide for a comparatively quick break in the electrical connections, and to insure uniform contact of the brush with the rings 55, the brush is loosely pivoted to the outer end of the arm, the connection, as shown, comprising a transverse slot 80 in the block 60 through which an attaching pin 82 extends into an enlarged opening 84, in the outer end of the arm. The free pivotal connection between the block and pin (see Fig. 3) insures that both ends of the block will be rocked into full and uniform contact with the two rings as the motor is started. Now, after the speed attained by the rotor is such that the tension of the spring is overcome by the counterweight tending to fly out, the first resulting action is that the lost motion between the pin and opening 84 is taken up, (centrifugal force meanwhile retaining the brush in contact), whereupon the block is jerked away quickly, as the counterweight flies out into contact with the abutment 77.

The running condition of the parts at normal speed, after the starting period, is illustrated in broken lines in Fig. 2. The arm 61 remains in the position shown in broken lines until the motor starts to slow down, in stopping, whereupon the parts assume their full line position in preparation for the new starting operation.

In addition to the obvious advantage of extreme simplicity, it will be seen that the operating parts of the switch are fully contained in a separate housing within the motor casing generally.

If, for example, pivoted arm of the switch at any time becomes freed from its pivot shaft, or parts of the arm disassociated with it, none of these parts will be allowed to fly out and damage the motor windings, for example, short circuiting the motor. The worst that can happen will be for the arm or its parts to be broken and the surfaces of the rings 55 scored; but all these parts may be easily removed and replaced in such event.

I claim:

1. A movable contactor mechanism for a centrifugal switch having annular contact rings and a rotary shaft concentric therewith, said contactor mechanism comprising an arcuate arm spaced from and extending partially around such shaft, a pivotal support for said arm eccentric to the shaft and movable therewith, a weight supported on one end of said arm, a brush pivotally mounted on the other end of said arm for movement radially toward said shaft independent of the movement of said arm, yieldable means for normally moving the brush holding end of said arm arcuately outwardly, and means other than said brush for limiting the inward movement of the brush holding end of said arm.

2. A movable contactor mechanism for a centrifugal switch having an annular contact ring and a rotatable shaft concentric therewith, said contactor mechanism comprising a comparatively light gauge sheet metal arcuate member extending partially around said shaft and parallel therewith, said member having a pair of radially extending ears, means movable with said shaft for pivotally connecting said ears to said shaft, one end of said arm having an outwardly extending portion, a weight supported by said outwardly extending portion, the other end of such arm having an outwardly extending portion, a contact brush mounted on said last-named portion of the arm and having a limited movement relative to said arm and substantially radially relative to said shaft and resilient means adapted to be overcome by centrifugal force consequent upon the rotation of said shaft and arranged to maintain the brush in its outermost position relative to such shaft when the shaft is idle.

3. A speed responsive mechanism for use with a rotatable shaft, said mechanism comprising an arm, a pivotal connection between said arm and said shaft, the axis of said pivot being parallel with and concentric to the axis of said shaft, said arm extending arcuately in two directions from said pivot, a weight carried at one end of said arm, an electric contact brush mounted on the other end of said arm, said brush being pivotally mounted on said arm and capable of movement radially to and from such shaft independent of the movement of said arm and independent of such pivotal movement, and yieldable means to normally maintain the weighted end of said arm inwardly relative to said shaft.

MILTON H. SPIELMAN.